Jan. 21, 1958 V. A. MILLER 2,820,906
RADIANT ENERGY SENSING SYSTEM
Filed Jan. 28, 1952

INVENTOR.
VICTOR A. MILLER
BY
William L. Lane
ATTORNEY

United States Patent Office 2,820,906
Patented Jan. 21, 1958

2,820,906
RADIANT ENERGY SENSING SYSTEM

Victor A. Miller, Long Beach, Calif., assignor to North American Aviation, Inc.

Application January 28, 1952, Serial No. 268,483

14 Claims. (Cl. 250—203)

This invention relates to a radiant energy sensing system, and particularly to a device for measuring the direction of deviation between a line of sight to a source of radiant energy and the optical axis of the system.

In patent application Serial No. 173,146, filed July 11, 1950, in the names of William B. Greenlee and Victor A. Miller, for "Star Sensing System" there is disclosed a star sensing system incorporating a rotating half-sector disc compensated to eliminate the effect of linear sky gradient by coincidence of the centroid of the transparent areas of the scanning reticle with the axis of rotation thereof. If the image of the star or other source of radiant energy falls within the circular effective region of the half-sector portion of the transparent area of the reticle, the effect of the device is to indicate the direction in which the orientation of the optical axis of the light-gathering optical system departs from a line of sight to the source of radiant energy. However, if the image falls within the annular effective region of the semiannular compensating area, the photoelectric cell still generates a signal at the fundamental frequency, but phase shifted by 180 degrees. The response of the system, therefore, is that an error recovery in exactly the wrong direction is undertaken, and the optical system is driven farther from the line of sight to the star rather than toward the line of sight to the star. This invention contemplates the provision of an improved reticle and a novel circuit for producing a signal whose sense indicates the direction in which correction must be undertaken to make the optical axis of the system coincide with the line of sight to the source of radiant energy when the image thereof falls within the compensating area.

It is therefore an object of this invention to provide an improved radiant energy source orientation detector.

It is another object of this invention to provide an improved reticle for use in connection with a star sensing system.

It is another object of this invention to provide an improved star sensing system.

It is another object of this invention to provide a star sensing system incorporating a compensated half-sector disc reticle, which system is capable of discriminating between signals produced when the image of the radiant energy source falls within the primary area of the reticle, and signals produced when the image of the radiant energy source falls within the compensating area of the reticle.

Other objects of invention will become apparent from the following description taken in connection with the accompanying drawings, in which.

Figure 1:
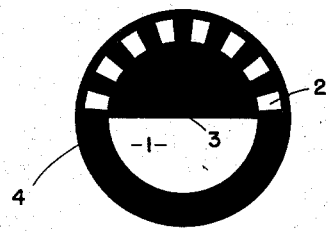
Fig. 1 is a plan view of the novel reticle of this invention.

Referring to the drawings, and in particular to Fig. 1, there is shown a circular disc reticle 4 having compensating and primary areas disposed in diametrically opposed sectors thereof. The reticle includes a half-sector-shaped, transparent area 1 and a number of separate transparent areas 2 having the shape of segments of a semiannulus radially coextensive with the half-sector-shaped primary area 1. The series of areas 2 may be termed compensating areas, and it is to be noted that while the number of such compensating areas may be varied, the centroid of all the transparent areas of the reticle falls upon axis of rotation 3 of the recticle, and all said areas are of similar size and identically spaced. Further, the primary area may be a sector of less than 180 degrees.

Figure 2:
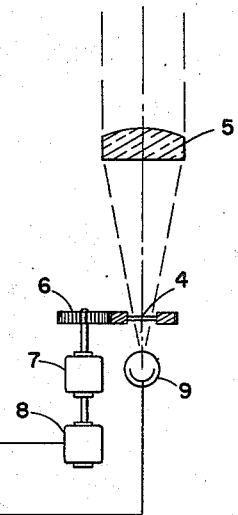
Fig. 2 is a schematic diagram of the invention.
Figure 2:
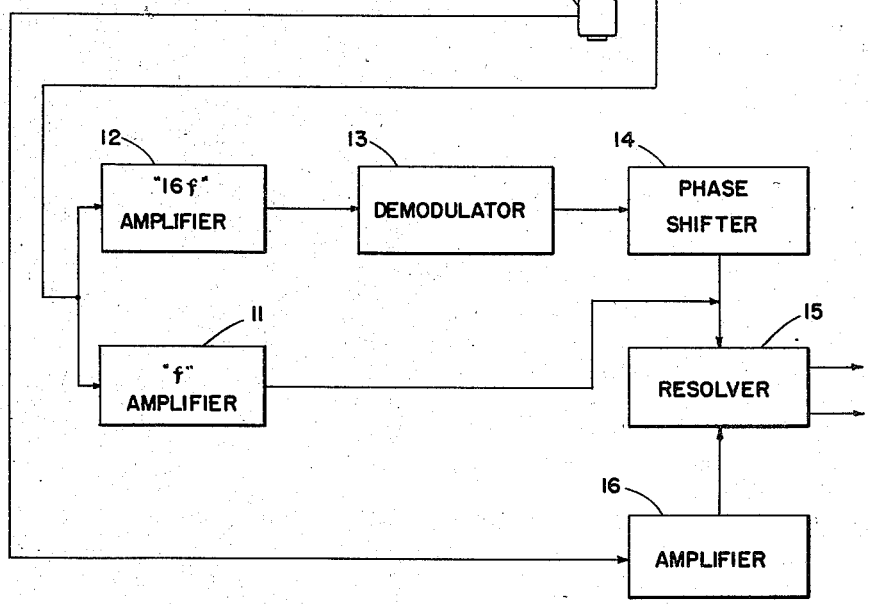

Referring now to Fig. 2, the optical system is shown schematically and includes lens 5 which gathers light from a source of radiant energy such as a star, and casts it upon reticle 4, the optical axis of the optical system coinciding with the axis of rotation of reticle 4. Reticle 4 is rim-driven by gear 6, which in turn is driven by motor 7 also connected to drive generator 8. Radiant energy modulated by the rotating reticle is cast upon photoelectric cell 9 which generates a signal having a frequency corresponding to the rate of rotation of the reticle. Generator 8 also produces a signal having a frequency corresponding to the rate of rotation of the reticle. The output of photoelectric cell 9 is fed to amplifiers 11 and 12, amplifier 11 being tuned to the frequency corresponding to the frequency of rotation of the reticle, and amplifier 12 being tuned to a frequency approximately equal to twice the product of the number of transparent areas 2 and the rotational frequency of the reticle. The output of amplifier 12 is fed to demodulator 13 which demodulates the signal amplified by amplifier 12 and feeds the demodulated signal to phase shifter 14 which phase shifts the signal by 180 degrees. The outputs of amplifier 11 and phase shifter 14 are fed to one input of a phase measuring device, such as to one winding of resolver 15; while the output of generator 8, amplified by amplifier 16, is fed to the other winding of the resolver. The gain of amplifier 12 must be greater than the gain of amplifier 11 because when the star image is in the compensating area the photocell output contains a fundamental frequency component which must be cancelled before the signal is fed to the resolver. The phase difference indicated by the resolver determines the direction in which the optical axis of optical system 5 must be reoriented in order that it may coincide with the line of sight to the star or other source of radiant energy. The output of the resolver may therefore be used to drive a gimbal system (not shown) for supporting and orientating the optical system.

In operation, if the image of the star or other source of radiant energy falls upon the axis of rotation of the reticle, the photoelectric cell receives an unmodulated signal, and no correction is to be undertaken. However, if the image falls somewhere within the effective region of area 1 of the reticle, a signal is generated at the fundamental frequency, which frequency is understood to be the frequency corresponding to the rotative frequency of the reticle and is amplified by amplifier 11 tuned to fundamental frequency "$f$." Since amplifier 12 is tuned to a much higher frequency, this signal is not appreciably amplified by amplifier 12 and the resolver responds to the signal amplified by amplifier 11 and that fed to it by amplifier 16, and correction may be undertaken. If, however, the image of the star or other source of radiant energy falls within the effective region of areas 2, the photoelectric cell generates a signal which with the reticle configuration shown in Fig. 1 is approximately 16 times that of the signal generated when the image falls within area 1. Amplifier 12 is tuned to amplify only the signal generated when the star image falls within the compensating areas, but amplifier 11 is not. Therefore, a signal is received by demodulator 13 which is phase shifted 180 degrees by phase shifter 14, and the resolver responds by producing an output indicative of the true orientation of the star or other source of radiant energy from the optical axis of optical system 5. Correction is then undertaken which gradually brings the line of sight to the star closer to the optical axis of optical system 5 and eventually causes the image of the star to fall within area 1 of the reticle. Correction then continues as previously indicated. It is to be noted that the inside radius of the semiannular transparent segments 2 exactly coincides with the outside radius of area 1. It is thus clear that the semiannular segments are radially coextensive with the half-sector-shaped transparent area 1, and if the image of the star is within the outside radius of areas 2 it must fall either within the effective regions of areas 2 or within area 1. The spacing of areas 2 from each other may be varied slightly if amplifier 12 is tuned to the resultant output frequency generated by these areas.

This invention obviously provides useful and correct information over a larger portion of the reticle since the star may fall within the compensating area and still produce a signal which is useful in orienting the optical system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A radiant energy sensing system comprising a photoelectric cell; an optical system for gathering radiant energy from a source thereof and casting it upon said photoelectric cell; a rotatable reticle interposed between said optical system and said photoelectric cell for modulating said radiant energy, said reticle being characterized by having a transparent area of half-sector shape and a plurality of similar transparent areas shaped like segments of a semiannulus radially coextensive with said half-sector area, the combined centroid of all said transparent areas being coincident with the axis of rotation of said reticle; generator means for producing an alternating current signal of frequency equal to the rate of rotation of said reticle; a first amplifier connected by its input to said photocell and tuned to amplify only a frequency equal to approximately twice the number of said plurality of transparent areas multiplied by the rotative rate of said reticle; a demodulator connected to demodulate the output of said first amplifier; a second amplifier tuned to amplify a frequency equal to the rotative rate of said reticle; a phase shifter for phase shifting by 180 electrical degrees the output of said demodulator; and a resolver for phase comparing the output of said generator means and the combined outputs of said phase shifter and said second amplifier whereby whether the image of said source of radiant energy falls upon the effective region of said plurality of transparent areas of said reticle or upon the effective region of said half-sector-shaped transparent area, the output of said resolver indicates the direction of motion of the optical axis of said optical system necessary to cause said axis to coincide with the line of sight to said radiant energy source.

2. A reticle for use in a radiant energy sensing system comprising a flat opaque disc having a half-sector-shaped transparent area with its straight side coinciding with a diameter of said disc, and a plurality of similar transparent areas similarly spaced and shaped like segments of an annulus radially coextensive with said half-sector-shaped area and arranged so that the combined centroid of all transparent areas of said disc falls upon the center of said disc.

3. A reticle for use in a star sensing system employing relative rotation of the light from a star and said reticle, comprising an opaque disc having a primary transparent area shaped like a half-sector disc, and a compensating area shaped like a segmented annulus radially coextensive with said half-sector area but arranged so that the centroid of all said transparent areas falls on the center of said reticle.

4. A device as recited in claim 3 and further comprising an optical system for passing light from a star through said reticle, means for rotating said reticle, and electronic means for indicating deviation of the line of sight to said star from the optical axis of said optical system in response to light modulation by said reticle.

5. In combination, a compensated half-sector disc reticle having a compensating and a primary area disposed in diametrically opposed sectors of said reticle, said compensating area segmented circumferentially to modulate at a different frequency than the primary area, and an electronic interpretive system for discriminating between light modulated by said primary area from that modulated by said compensating area whereby whether the image of a radiant energy source falls upon said primary area effective region or upon said compensating area effective region, anomalous signals are prevented.

6. A device as recited in claim 5 and further comprising an optical system for casting light from a star upon said reticle.

7. A device as recited in claim 5 in which said interpretive system comprises a photoelectric cell for receiving light modulated by said reticle, means for rotating said reticle at constant speed, demodulating means for demodulating only signals produced by said photocell from light transmitted by said compensating area, means for generating a signal having a frequency equal to the rotative rate of said reticle, and resolver means for phase comparing the signal from said generating means and the combination of signals from said demodulating means and said photoelectric cell whereby the output of said resolver is indicative of the angular departure of the line of sight to said radiant energy source from the axis of rotation of said reticle.

8. A reticle for use in a radiant energy sensing system employing relative rotation of the radiant energy from a source of radiant energy and said reticle comprising an opaque disc having a primary transparent area shaped like a half-sector disc and a compensating area of minimum radius larger than the maximum radius of said half-sector shaped area and shaped like a segmented annulus, the centroid of all said transparent areas falling on the center of rotation of said reticle.

9. In combination, a compensated half-sector disc reticle having primary and compensating areas said compensating area being segmented circumferentially to modulate at a different frequency than the primary area, means for rotating said reticle at a constant predetermined speed, and an electronic interpretive system responsive to the rotative speed of said reticle and alternatively responsive to radiant energy modulated by the primary and compensating areas of said reticle for discriminating between radiant energy modulated by said primary area from that modulated by said compensating area whereby whether the image of a radiant energy source falls upon said primary area effective region or said compensating area effective region anomalous signals are prevented.

10. A reticle for use in a radiant energy sensing system comprising a flat opaque disc having a sector-shaped transparent area, a plurality of similar transparent areas similarly spaced and shaped like segments of an annulus of inner radius at least equal to the radius of said sector and arranged so that the combined centroid of all transparent areas of said disc falls upon the center of said sector.

11. A uniform radiant energy gradient compensated reticle having a primary transparent area and a segmented transparent compensating area arranged on diametrically opposed sides of said reticle for alternatively transmitting received radiant energy whereby if said reticle is rotated in the path of radiant energy, the modulation of said energy produced by said area differs in frequency from that produced by said compensating area.

12. A uniform radiant energy gradient compensated reticle having a primary area and a segmented transparent compensating area for alternatively transmitting received radiant energy whereby if said reticle is rotated in the path of radiant energy, the modulation of said energy produced by said primary area differs in frequency from that produced by said compensating area, said primary area being of half-sector shape and said compensating area comprising a plurality of transparent areas shaped like segments of an annulus radially coextensive with said half-sector-shaped area, said primary and compensating areas being on opposed sides of a common diametrical line of said reticle.

13. A compensated half-sector disc reticle having disposed on opposed sides of a common diametrical line thereof a principal transparent area and a compensating area for eliminating the effect of uniform gradient background radiation, said compensating area being circumferentially segmented and of interior radius equal to the outer radius of the principal transparent area whereby if said reticle is rotated in the path of radiant energy, said compensating area and said primary area alternatively modulate said radiant energy at different frequencies.

14. A device as recited in claim 13 and further comprising means for casting radiant energy from a radiant energy source upon said reticle, means for rotating said reticle, and means responsive to modulation of said energy by said reticle for indicating the direction of misorientation of said radiant energy casting means from a line of sight to said radiant energy source.

References Cited in the file of this patent

UNITED STATES PATENTS

| | | |
|---|---|---|
| 1,618,757 | Hoxie | Feb. 22, 1927 |
| 2,369,622 | Toulon | Feb. 13, 1945 |
| 2,421,012 | Chew | May 27, 1947 |
| 2,428,990 | Rajchman | Oct. 14, 1947 |
| 2,439,373 | Stearns | Apr. 6, 1948 |
| 2,513,367 | Scott | July 4, 1950 |

FOREIGN PATENTS

| | | |
|---|---|---|
| 33,746 | Netherlands | Sept. 16, 1934 |